Patented May 12, 1931

1,805,355

UNITED STATES PATENT OFFICE

MAX BOCKMÜHL, OF FRANKFORT-ON-THE-MAIN-HOCHST, AND ROBERT KNOLL, OF HORNAU-ON-THE-TAUNUS, GERMANY, ASSIGNORS TO I. G. FARBENINDUSTRIE AKTIENGESELLSCHAFT, OF FRANKFORT-ON-THE-MAIN, GERMANY

BASIC COMPOUNDS AND PROCESS OF PREPARING THEM

No Drawing. Application filed December 26, 1929, Serial No. 416,742, and in Germany January 2, 1929.

Our present invention relates to basic compounds and process of preparing them.

We have found that higher fatty acids, their esters, chlorides and amides of the following general formula:

wherein R stands for an aliphatic residue containing at least 10 carbon atoms and X for OH, O-alkyl, halogen, $NH_2$ or a $NH_2$-group the hydrogen atoms of which are substituted by alkyl, aryl or aralkyl, may be condensed in a smooth way with amino alcohols containing at least 2 amino groups one of which being a tertiary one, whereby basic products are formed being valuable technical helps for preparing rubber and valuable thickening agents for cosmetics and remedies. The condensation may be carried out by causing the products to react upon one another at ordinary temperature, preferably in the presence of an organic solvent. In many cases it is necessary to heat the reaction mixture at a higher temperature.

The following examples serve to illustrate the invention, but they are not intended to limit it thereto.

(1) 28.2 grams of oleic acid and 14 grams of alpha-diethylamino-beta-hydroxypropylamine are heated for 10 hours to 220° C. on the oil bath. The reaction product is a thick oil, the hydrochloride is a fat-like mass. The aqueous solutions of the salts, for instance of the hydrochloride, the lactate and the benzoate, are very viscous already at a small concentration.

(2) 6.2 grams of oleic acid ethyl ester and 2.5 grams of alpha-diethylamino-beta-hydroxypropylamine are heated in the tube for 10 hours to 220° C. After cooling the alcohol is removed in a vacuum. The reaction product is a thick oil, the hydrochloride is a fat-like mass.

(3) 14.1 grams of stearic acid amide and 7.3 grams of alpha-diethylamino-beta-hydroxypropylamine are heated on the oil bath for 8 hours to 200° C.-230° C., ammonia being evolved. After cooling the reaction product forms a tallow-like mass the salts of which are soluble in water.

(4) 6 grams of oleic acid chloride in 15 cc. of acetone are mixed with 4.4 grams of alpha-diethylamino-beta-hydroxy-gamma-phenyl-aminopropane. After the solvent has been distilled off the hydrochloride of the new base is obtained in the form of a thick yellowish oil soluble in water.

(5) 6.1 grams of stearic acid chloride in 15 cc. of acetone are mixed with 4.4 grams of alpha-diethylamino-beta-hydroxy-gamma-phenylaminopropane. After the solvent has been distilled off the hydrochloride of the new compound is obtained in the form of a tallow-like mass.

We claim:

1. The process which consists in causing a compound of the following formula:

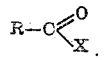

wherein R stands for an aliphatic residue containing at least 10 carbon atoms and X stands for OH, O-alkyl, halogen, $NH_2$ or a $NH_2$-group the hydrogen atoms of which are substituted by alkyl, aryl or aralkyl, to react with an amino alcohol containing at least two amino groups one of which being a tertiary one.

2. The process which consists in heating a compound of the following formula:

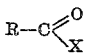

wherein R stands for an aliphatic residue containing at least 10 carbon atoms and X for OH, O-alkyl, halogen, $NH_2$ or a $NH_2$-group the hydrogen atoms of which are substituted by alkyl, aryl or aralkyl, with an amino alcohol containing at least two amino groups one of which being a tertiary one.

3. The process which consists in causing a compound of the following formula:

wherein R stands for an aliphatic residue containing at least 10 carbon atoms and X stands for OH, OC$_2$H$_5$, chlorine or NH$_2$, to react with an amino alcohol containing at least two amino groups one of which being a tertiary one.

4. The process which consists in heating a compound of the following formula:

wherein R stands for an aliphatic residue containing at least 10 carbon atoms and X stands for OH, OC$_2$H$_5$, chlorine or NH$_2$ with an amino alcohol containing at least two amino groups one of which being a tertiary one.

5. The process which consists in causing a compound of the following formula:

wherein R stands for an aliphatic residue containing at least 10 carbon atoms and X stands for OH, OC$_2$H$_5$, chlorine or NH$_2$, to react with an amino alcohol of the following formula:

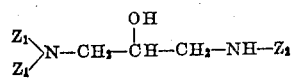

wherein Z$_1$ stands for alkyl and Z$_2$ for hydrogen, alkyl or aryl.

6. The process which consists in heating a compound of the following formula:

wherein R stands for an aliphatic residue containing at least 10 carbon atoms and X for OH, OC$_2$H$_5$, chlorine or NH$_2$, with an amino alcohol of the following formula:

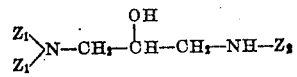

wherein Z$_1$ stands for alkyl and Z$_2$ for hydrogen, alkyl or aryl.

7. The process which consists in causing a compound of the following formula:

wherein R stands for an aliphatic residue containing at least 10 carbon atoms and X stands for OH, OC$_2$H$_5$, chlorine or NH$_2$ to react with an amino alcohol of the following formula:

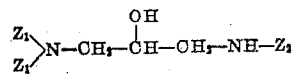

wherein Z$_1$ stands for alkyl and Z$_2$ for hydrogen or phenyl.

8. The process which consists in heating a compound of the following formula:

wherein R stands for an aliphatic residue containing at least 10 carbon atoms and X stands for OH, OC$_2$H$_5$, chlorine or NH$_2$, with an amino alcohol of the following formula:

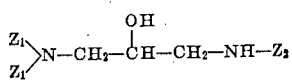

wherein Z$_1$ stands for alkyl and Z$_2$ for hydrogen or phenyl.

9. The process which consists in causing oleic acid to react with an amino alcohol of the following formula:

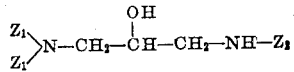

wherein Z$_1$ stands for alkyl and Z$_2$ for hydrogen or phenyl.

10. The process which consists in heating oleic acid with an amino alcohol of the following formula:

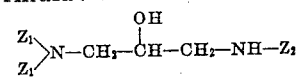

wherein Z$_1$ stands for alkyl and Z$_2$ for hydrogen or phenyl.

11. The process which consists in causing oleic acid to react with an alpha-diethyl-amino-beta-hydroxy-propylamine.

12. The process which consists in heating at a temperature of about 220° C. oleic acid with an alpha-diethylamino-beta-hydroxy-propylamine.

13. As new products, the condensation products of a compound of the following formula:

wherein R stands for an aliphatic residue containing at least 10 carbon atoms and X for OH, -O-alkyl, halogen, NH$_2$ or an NH$_2$-group the hydrogen atoms of which are substituted by alkyl, aryl or aralkyl, with an amino alcohol containing at least two amino groups one of which being a tertiary one, these products being fat-like thick oils and forming water-soluble salts, the solutions of which are viscous already at a small concentration.

14. As new products the condensation products of a compound of the following formula:

wherein R stands for an aliphatic residue containing at least 10 carbon atoms and X stands for OH, OC$_2$H$_5$, chlorine or NH$_2$, with an amino alcohol containing at least two amino groups one of which being a tertiary one, these products being fat-like thick oils and forming water-soluble salts, the solutions of which are viscous already at a small concentration.

15. As new products, the compounds of the following formula:

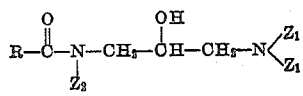

wherein R stands for an aliphatic residue containing at least 10 carbon atoms, $Z_2$ for hydrogen or phenyl and $Z_1$ for alkyl, being fat-like oils and forming water-soluble salts, the solutions of which are viscous already at a small concentration.

16. As new products, the compounds of the following formula:

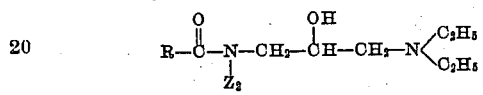

wherein R stands for an aliphatic residue of at least 10 carbon atoms and $Z_2$ for hydrogen or phenyl, being fat-like thick oils and forming water-soluble salts, the solutions of which are viscous already at a small concentration.

17. As a new product, the compound obtained by condensing oleic acid with alpha-diethylamino-beta-hydroxy-propylamine, which product is a thick oil, its hydrochloride a fat-like mass and the aqueous solutions of the salts, for instance of the hydrochloride, the lactate and the benzoate, are very viscous already at a small concentration.

In testimony whereof, we affix our signatures.

DR. MAX BOCKMÜHL.
DR. ROBERT KNOLL.